United States Patent [19]

Olsen et al.

[11] 4,131,037
[45] Dec. 26, 1978

[54] ADJUSTABLE INTERLOCK HAND LEVER

[75] Inventors: Roger F. Olsen, Cuyahoga Falls; George Cantley, Akron, both of Ohio

[73] Assignee: Incom International Inc., Pittsburgh, Pa.

[21] Appl. No.: 820,490

[22] Filed: Jul. 29, 1977

[51] Int. Cl.² .................. B60K 41/04; G05G 5/10; G05G 11/00; G05G 1/00

[52] U.S. Cl. .................... 74/876; 74/477; 74/483 R; 74/491; 74/878; 192/.096

[58] Field of Search .......... 192/.096; 74/872, 875, 74/876, 878, 471 R, 475–477, 483 R, 491

[56] References Cited

U.S. PATENT DOCUMENTS

| | | | |
|---|---|---|---|
| 3,127,785 | 4/1964 | Morse et al. | 192/.096 X |
| 3,511,117 | 5/1970 | Morse | 74/876 |
| 3,581,603 | 6/1971 | Farrington et al. | 74/876 |
| 3,842,695 | 10/1974 | Farrington et al. | 74/876 |
| 3,929,039 | 12/1975 | Karl | 74/878 |

Primary Examiner—Leonard H. Gerin
Attorney, Agent, or Firm—James C. Wray

[57] ABSTRACT

A single lever control unit for sequentially operating a transmission and throttle and, selectively, for operating the throttle independently of the transmission. A throttle shaft assembly disengages from a throttle gear by pulling out the shaft while in the neutral position. A double key on the throttle shaft disengages from a keyway in the throttle gear and a spring-loaded pin engages a cavity in the throttle gear to lock both shift and throttle gears in the neutral position. Throttle only may then be applied. When the hand lever is returned to the neutral position, the throttle shaft automatically engages the throttle gear and the locking pin automatically disengages by means of spring loading. The locking pin prevents pulling out the shaft in other than the neutral position.

A spring provides axial loading between a throttle arm connected to the shaft and a friction plate mounted on the shaft. This loading creates a frictional drag which prevents throttle creep. Additional throttle braking is achieved during throttling by means of an adjustable screw forcing a friction pad against a specially profiled side of the throttle gear.

An adjustable flange accommodates a neutral interlock lever. The flange can be angularly oriented in any desired position.

27 Claims, 8 Drawing Figures

ADJUSTABLE INTERLOCK HAND LEVER

BACKGROUND OF THE INVENTION

1. Field of the Invention

This invention relates generally to control levers and more particularly has reference to an adjustable mounting for a rotatable and axially translatable shaft connected to a hand operated control lever.

2. Description of the Prior Art

Pertinent U.S. and foreign patents are found in Class 192, subclasses .096 and .098 and Class 74, subclasses 372, 471R, 475, 476, 477, 483, 491, 504, 511, 519, 523, 872, 875, 876 and 878 of the official classifications of patents in the U.S. Patent and Trademark Office.

Examples of pertinent patents are U.S. Pat. Nos. 2,254,144; 3,127,785; 3,511,117; 3,581,603; 3,842,695 and 3,929,039.

In U.S. Pat. No. 3,842,695, the lever and shaft are not capable of axial movement, but a slider shaft in the lever assembly can be retracted. When the transmission is in the neutral position, retraction of the slider shaft disengages key 96 having projection 100 from the driving gear 56, and pulls pin 108 into hole 110. U.S. Pat. No. 3,581,603 discloses a similar mechanism. U.S. Pat. No. 3,842,695 differs from the invention in several ways: first, the lock is on the slider shaft, not the lever; second, the slider shaft is nonrotatable; third, the lock is not spring biased. In U.S. Pat. No. 3,581,603 the slider shaft is rotatable.

U.S. Pat. Nos. 3,511,117 and 3,127,785 disclose control levers which can be pulled outward when in neutral position, to open the throttle independently of the shift function. The control lever is spring biased. In U.S. Pat. No. 3,511,117, blocking flange 134 locks against reverse curved portion 133 of interlocking plate 131 to prevent accidental shift while in the neutral throttle mode. Lateral wings 135 or 136 are interposed between the blocking flange 134 and gear 38 to prevent axial translation of the control lever 18 except in the neutral position. U.S. Pat. No. 3,127,785 has a similarly functioning plate 70 and flange 37.

The lever in U.S. Pat. No. 3,929,039 contains a spring-loaded coupling shaft which can be disengaged while the lever is in a neutral position. The coupling shaft has radially extending pins 25 which couple the main shaft to the throttle gear. Pressing in the coupling shaft against the spring disengages the pins from the gear, and the gear from the shaft. In operation, this mechanism functions in the reverse manner from the invention.

Many problems remain in the prior art devices. One problem lies in mounting restrictions which must necessarily be imposed in order to assure that the hand lever is placed in a convenient and accessible position. No mechanism is disclosed which allows the control unit to be mounted in any position while permitting orientation of a neutral interlock hand lever at any desired position.

SUMMARY OF THE INVENTION

The present invention overcomes the problems which exist in the prior art devices. In preferred form, the invention provides an adjustable interlock, which allows a neutral interlock lever to be oriented at any desired position. A collar with external teeth is mounted on the shaft of the lever; these teeth mate with internal teeth on a mounting flange. A notch in the collar receives a projection on the lever when the lever is rotated to the desired interlock position. The projection prevents axial translation of the lever except at the interlock position. The projection is disengaged from the notch to permit rotation of the lever from the interlock position without axial translation of the lever.

Objects of the invention are, therefore, to provide an improved adjustable interlock apparatus for a control unit having a shaft rotatably supported in and axially translatable with respect to a housing comprising, a collar disposed about the shaft and having a notch in an axially outward surface, engaging means connected to the shaft and having an axially inward surface abutting the axially outward surface of the collar for preventing axial translation of the shaft toward the housing when the shaft is rotated from a selected interlock position, the engaging means further configured to engage the notch when the shaft is rotated to the selected interlock position thereby permitting axial translation of the shaft toward the housing, and retaining means connected to the housing and collar for securing the collar in a rotational orientation selected to permit engagement of the notch and engaging means when the shaft is rotated to the interlock position, the collar has an axial portion terminating inwardly in a radially extending flange, the axial portion provided with annular serrations on an exterior lateral surface, and the retaining means comprise a plate overlying the flange to hold the flange against the housing and having an opening sufficiently large to receive the axial portion of the collar, the plate provided with annular serrations disposed about the opening configured to matingly engage the serrations on the collar, the flange having a sufficiently large transverse dimension to prevent receipt of the flange within the opening.

These and other and further objects and features of the invention are apparent in the disclosure which includes the above and below specifications and claims and drawings.

DETAILED DESCRIPTION OF THE DRAWINGS

Figure 1:
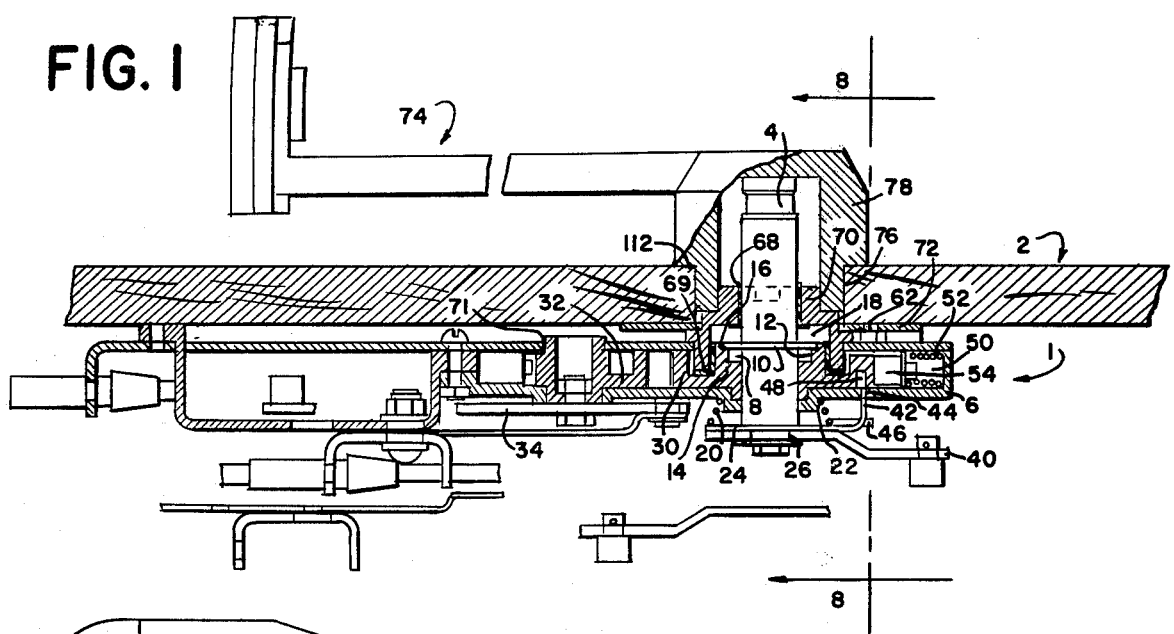
FIG. 1 is a longitudinal cross section of a single lever control embodying the features of the present invention.
Figure 2:
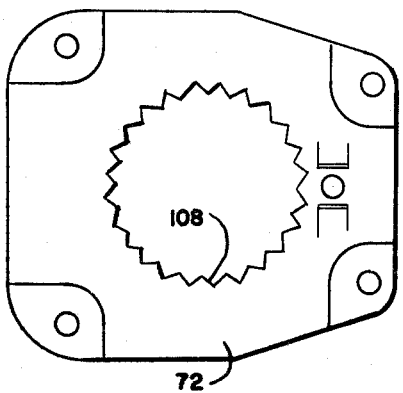
FIG. 2 is a top plan detail of the mounting flange shown in FIG. 1.
Figure 3:
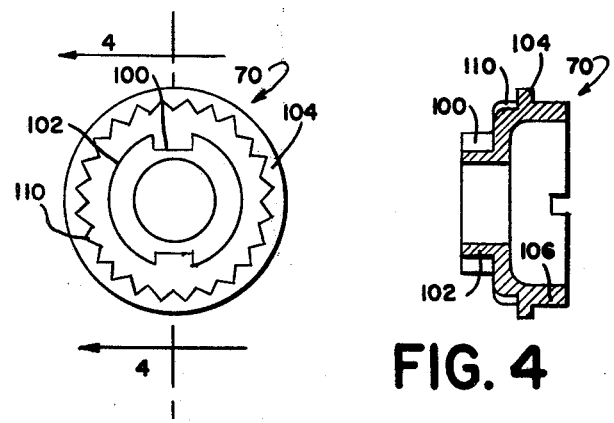
FIG. 3 is a top plan detail of the collar shown in FIG. 1.
Figure 4:
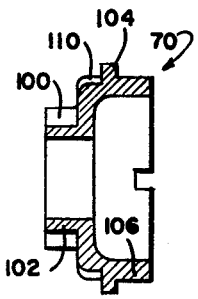
FIG. 4 is a longitudinal cross section taken substantially along the line 4—4 of FIG. 3.

Referring to FIG. 1, a single lever control unit 1 is shown attached to a mounting board 2. Preferably, the unit is adapted to sequentially operate a transmission and throttle and, selectively, to operate the throttle independently of the transmission.

The control unit 1 has a shaft 4 mounted in a housing 6 for rotational and axial movement. The shaft 4 is provided with keys 8 adjacent an annular flange 10. The keys 8 are configured to engage keyways 12 in a hub 14 rotatably mounted in the housing 6. The flange 10 abuts an annular shoulder 16 on the hub 14 when the keys 8 and keyways 12 are engaged. The shaft 4 communicates rotary actuating forces to the hub 14 through the keys 8.

A space 18 is provided adjacent the shaft 4 above the annular flange 10 to permit axial translation of the shaft 4. When translated, the keys 8 and keyways 12 disengage, thereby permitting rotation of the shaft 4 without consequent rotation of the hub 14. The lower surface of the keys 8 abut the upper surface of the hub 14 until further rotation of the shaft 4 causes the keys 8 to realign with the keyways 12.

A spring 20 surrounds the end of the shaft 4. The upper end of the spring 20 abuts an annular shoulder 22 on the housing 6. The lower end of the spring 20 abuts a friction plate 24 mounted on the shaft 4 adjacent a throttle actuating member 26 rigidly connected to the end of the shaft 4. The spring 20 continuously urges the keys 8 and annular flange 10 on the shaft 4 toward the hub 14. This causes the keys 8 to automatically engage the keyways 12 when the shaft 4 rotates the keys 8 into alignment with the keyways 12.

Figure 6:
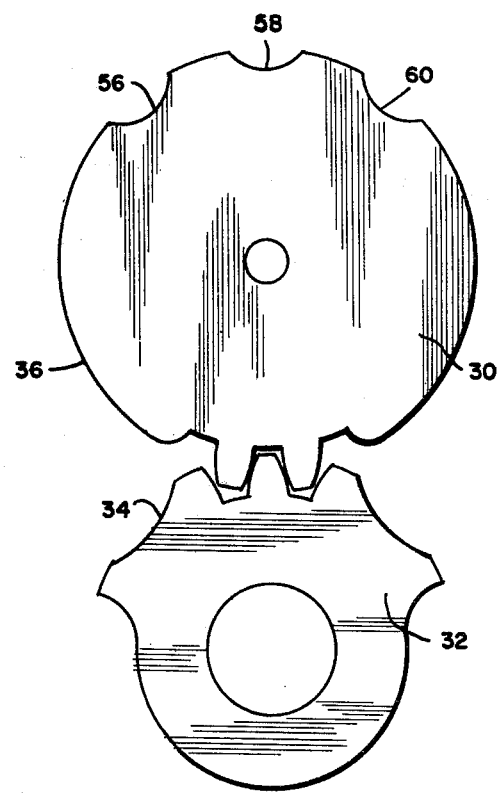
FIG. 6 is a top plan detail of the throttle gear and shifting gear shown in FIG. 1.

The hub 14 has a throttle gear portion 30. The throttle gear 30 is a Geneva type wheel which operatively engages a Geneva wheel 32 rotatably mounted in the housing 6. The Geneva wheel 32 is rigidly connected to a shift control arm 34; the arm 34 and wheel 32 rotating simultaneously. As shown in FIG. 6, rotation of the throttle gear 30 causes rotation of the Geneva wheel shift gear 32 only when the teeth of the gears 30 and 32 are meshed. Substantial rotation of the throttle gear 30 in either direction causes the teeth of the throttle gear 30 and shift gear 32 to disengage. Continued rotation of the throttle gear 30 causes a reversed curve portion 34 of the shift gear 32 to mate with a curved surface 36 on the throttle gear 30 to prevent rotation of the shift gear 32.

The sequential shifting and throttling operations of the control unit as well as the selective independent throttling operation of the control unit can now be readily understood. The throttle control arm 40 is connected to an engine throttle operator (not shown). Similarly, the shift control arm 34 is connected to a transmission operator (not shown). The connections are made in a manner to permit neutral idling of the engine when the throttle gear 30 and shift gear 32 are aligned as in FIG. 6. Rotation of the shaft 4 in one direction rotates the throttle gear 30 in the same direction. Initially, the shift gear 32 is also rotated in the same direction. When the reversed curve portion 34 of the shift gear 32 abuts the curved portion of the throttle gear 30, the shift gear 32 stops rotating. At this point, the shifting of the transmission from neutral to an operative gear, for example, forward gear, is complete. Continued rotation of the shaft 4 causes rotation of the throttle gear 30 and throttle actuating member 26. Consequently, the engine is throttled. When the shaft 4 is rotated in the opposite direction, the throttle gear 30 and throttle actuating member 26 rotate in a similar direction. Initially, engine throttle is reduced. Continued rotation of the shaft 4 causes the teeth on the throttle gear 30 and shift gear 32 to mesh. The transmission is shifted from forward gear to neutral. If the shaft 4 is further rotated, the transmission is shifted from neutral to reverse gear. Reverse throttle is then applied by continued rotation of the shaft 4. In order to prevent throttling while the shifting gear 32 is rotating, the throttle control arm 40 is connected to the throttle operator by an appropriate lost motion device, or any similarly functioning device.

A locking arm 42 is connected to the friction plate 24 and is received within an opening 44 in the housing 6. The end 46 of the spring 20 projects through an opening in the locking arm 42 and is thereby connected to the locking arm 42. The throttle gear 30 is provided with a notch 48 configured to receive the locking arm 42 when the notch 48 is aligned with the opening 44 in the housing 6. The notch 48 is positioned to align with the opening 44 in the housing 6 when the throttle gear 30 and shift gear 32 are in neutral alignment.

Axial translation of the shaft 4 in neutral disengages the keys 8 from the keyways 12 and projects the locking arm 42 into the notch 48 in the throttle gear 30, thereby locking the throttle gear 30 and shift gear 32 in neutral position. Rotation of the shaft 4 throttles the engine. The spring 20 urges the friction plate 24 into frictional engagement with the throttle actuating member 26 to prevent throttle creep. When the shaft 4 is rotated to the neutral position, the keys 8 automatically engage the keyways 12 and the locking arm 42 automatically disengages the notch 48 in the throttle gear 32 by means of axial loading created by the spring 20. The end 46 of the spring 20 connected to the locking arm 42 facilitates removal of the arm 42 from the notch 48 in the throttle gear 30 and supports the arm 42.

When the throttle gear 30 is rotated from neutral alignment, the notch 48 in the throttle gear 30 is moved from alignment with the opening 44 in the housing 6. The locking arm 42 prevents axial translation of the shaft 4.

Figure 8:
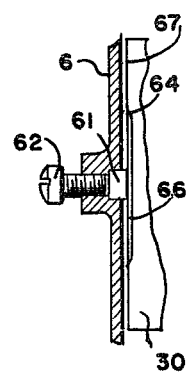
FIG. 8 is a sectional detail taken substantially along the line 8—8 of FIG. 1.
Figure 7:
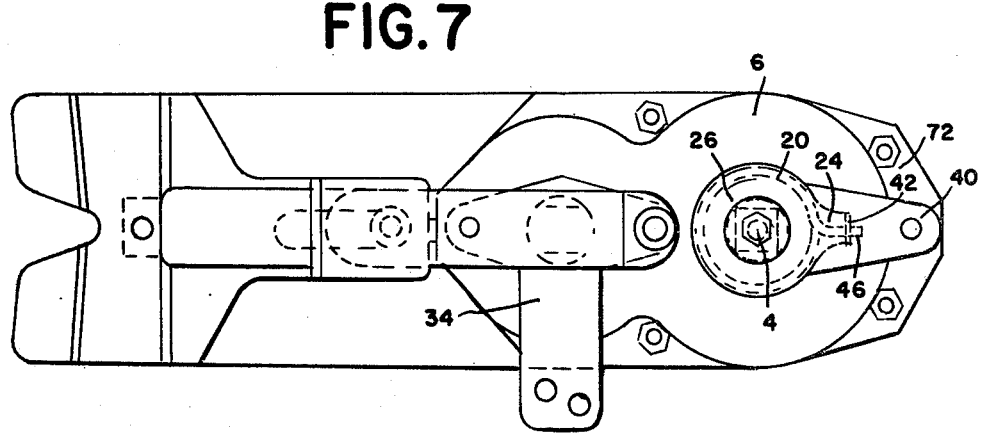
FIG. 7 is a rear plan view of the apparatus shown in FIG. 1.

A detent 50 is mounted in the housing 6 adjacent the throttle gear 30. The detent has a spring 52 which continuously urges a roller 54 against the side of the throttle gear 30. The gear 30 is provided with spaced notches 56, 58 and 60 configured to receive the roller 54. The central notch 58 is positioned to receive the roller 54 when the throttle gear 30 is in neutral alignment. The side notches 56 and 60 are positioned to receive the roller 54 when the reverse curved portion 34 of the shift gears 32 is first rotated into contact with the curved portion 36 of the throttle gear 30. Engagement of the roller 54 with the notches 56, 58 and 60 tends to lock the throttle gear 30 against rotation. The operator of the control unit 1 is thereby given indications that the engine is in neutral or forward or reverse gear. Additionally, the side notches 56 and 60 are positioned to engage the roller 54 when the control unit 1, operating in sequential mode, completes the shifting operation and begins the throttling operation. A friction pad 61 is connected at the end of a screw 62 threadedly mounted in a housing 6. As best shown in FIG. 8, the pad 61 is positioned to abut a specially profiled surface 64 of the throttle gear 30. The surface 64 has a portion 66 recessed from the friction pad 61; the arc length of the portion 66 corresponding to the amount of angular displacement of the throttle gear 30 during which the throttle gear 30 rotates the shifting gear 32. When the control unit 1 operates in the shifting mode, the friction pad 61 offers relatively little frictional resistance to the rotation of the throttle gear 30 since the friction pad 60 is aligned with the recessed portion 66 of the throttle gear 30. In the throttling mode, however, the friction pad 61 is aligned with the portion 67 of the profiled surface 64 of the gear 30 closely adjacent the inward surface of the housing 6, thereby offering a relatively large frictional resistance to the rotation of the throttle gear 30. The amount of frictional resistance offerred by the pad 61 to the rotation of the gear 30 can be adjusted by the screw 62.

It is appreciated that the control unit 1 is readily adaptable for use with power boat engines. Consequently, sleeve bearings 68, 69 and 71 are provided to seal the unit 1 and to prevent damage to the components of the unit 1 due to the environment.

An interlock collar 70 and a collar retainer 72 are connected to the control unit 1 prior to mounting the control unit 1 on the mounting surface 2. A neutral interlock hand lever 74 is connected to the end of the shaft 4 projecting through the opening 76 in the mounting surface 2. The lower end of the hand lever cap 78 surrounds a portion of the interlock collar 70 and is provided with means to lock the hand lever 74 against further rotation when the hand lever 74 is moved to a neutral position.

Figure 5:
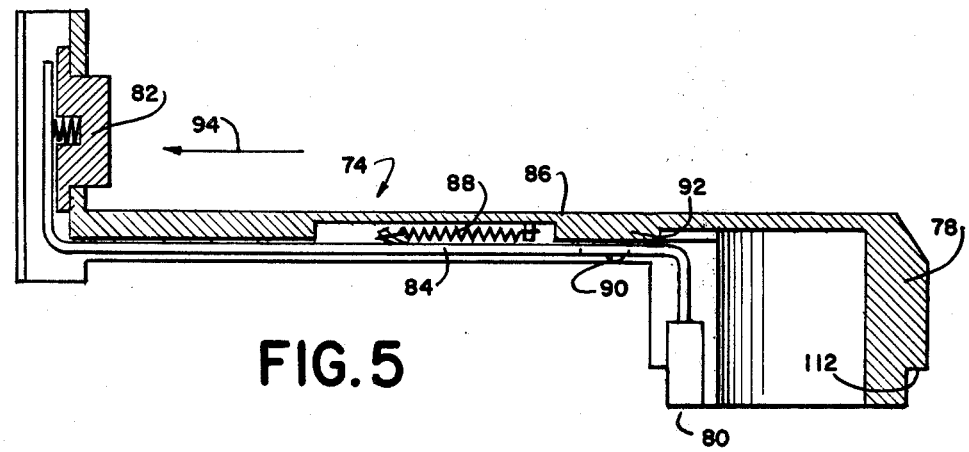
FIG. 5 is a longitudinal cross section of the hand lever shown in FIG. 1.

As shown most clearly in FIG. 5, the hand lever 74 has a block 80 slidably mounted within the cap 78. The block 80 is connected to a release button 82 by an arm 84 slidably mounted within the shaft 86 of the hand lever 74. A spring 88 connected to the arm 84 and the shaft 86 urges the block 80 toward the center of the cap 78. A screw 90 projects through a slot in the arm 84 and is received within a sliding block 92 formed inside the shaft 86 to keep the arm 84 in proper alignment. Moving the button 82 in the direction indicated by the numeral 94 slides the block 80 toward the side of the cap 78. When the button 82 is released, the spring 88 causes the block 80 to automatically move toward the center of the cap 78.

The cap 78 is positioned on the collar 70 in a manner which enables the radially inward surface of the block 80 to abut the radially outward surface of the upper axial portion 102 of the collar 70. The cap 78 is connected to the shaft 4 and rotates with the shaft 4. Rotation of the shaft 4 causes the block 80 to move along the surface 102 of the collar 70. A notch 100 provided in the upper axial portion 102 of the collar 70 is configured to receive the block 80 when the block 80 is aligned with the notch. Preferably, the notch 100 is positioned to engage the block 80 when the hand lever 74 and shaft 4 are rotated to a neutral position. Engagement of a block 80 and notch 100 prevents further rotation of the hand lever 74 and shaft 4.

Moving the button 82 in the direction indicated by numeral 94 moves the block 80 toward the side of the cap 78, thereby disengaging the block 80 and the notch 100. The hand lever 74 and shaft 4 can then be rotated from the neutral position. When the hand lever 74 and shaft 4 are returned to the neutral position, the spring 88 causes the block 80 to automatically engage the notch 100 thereby automatically preventing further rotation of the hand lever 74 and shaft 4.

The collar 70 is held against the housing 6 by the retainer 72 which overlies an annular flange 104 on the lower axial portion 106 of the collar 70. The retainer 72 is provided with serrations 108 configured to engage serrations 110 on the lower axial portion 106 of the collar 70 adjacent the flange 104. The serrations 108 and 110 prevent rotation of the collar 70 when engaged.

Prior to mounting the control unit 1 on the mounting plate 2, the collar 70 is oriented in the retainer 72 in any desired position. Preferably, the collar 70 is oriented in a manner which positions the interlock notch 100 to engage the block 80 when the hand lever 74 is in an appropriate neutral orientation.

Cap 78 is provided with an annular shoulder 112 which abuts the outward surface of the mounting board 2 when the keys 8 on the shaft 4 engage the keyways 12 in the hub 14. When the shaft 4 is translated axially to disengage the keys 8 and keyways 12, the shoulder 112 is spaced from the surface of the mounting board 2 thereby providing an indication to the operator that the control unit 1 is in the neutral throttle mode of operation.

In an alternative embodiment, the cap 78 is positioned on the collar 70 in a manner which enables the axially inward surface of the block 80 to abut the axially outward end of the upper axial portion 102 of the collar 70 when the hand lever 74 is rotated from the neutral position while the control unit 1 is in the neutral throttle mode of operation. When the hand lever 74 is rotated to the neutral position, the block 80 engages the notch 100, thereby permitting axial translation of the shaft 4 and engagement of the keys 8 with the keyways 12 under loading from the spring 20. The hand lever 74 is rotated from the neutral position in the manner previously described.

While the invention has been described with reference to a specific embodiment, the exact nature and scope of the invention is defined in the following claims.

What is claimed is:

1. Adjustable interlock apparatus for a control unit having a shaft rotatably supported in a housing comprising, a collar disposed about the shaft and having a notch,
engaging means connected to the shaft and configured to engage the notch when the shaft is rotated to a selected interlock position, and
retaining means connected to the housing and collar for securing the collar in a rotational orientation selected to permit engagement of the notch and engaging means when the shaft is rotated to the interlock position.

2. The apparatus of claim 1 wherein the retaining means further secures the collar against axial movement.

3. The apparatus of claim 1 wherein the collar is provided with annular serrations on an exterior lateral surface, and the retaining means comprise a plate having an opening configured to receive the collar,
the plate provided with annular serrations disposed about the opening configured to matingly engage the serrations on the collar.

4. The apparatus of claim 1 wherein the collar has an axial portion terminating inwardly in a radially extending flange,
the axial portion provided with annular serrations on an exterior lateral surface, and
the retaining means comprise a plate overlying the flange to hold the flange against the housing and having an opening sufficiently large to receive the axial portion of the collar,
the plate provided with annular serrations disposed about the opening configured to matingly engage the serrations on the collar, the flange having a sufficiently large transverse dimension to prevent receipt of the flange within the opening.

5. The apparatus of claim 1 wherein
the collar has an axially inward portion provided with a radially extending flange,
the collar further provided with serrations on an exterior surface, and
the retaining means comprise a plate overlying the flange to hold the flange against the housing and having an opening sufficiently large to receive the collar,
the plate provided with serrations disposed to matingly engage the serrations on the collar,
the flange having a sufficiently large transverse dimension to prevent receipt of the flange within the housing.

6. The apparatus of claim 1 wherein
the collar is provided with serrations on an exterior surface, and
the retaining means comprise a plate having an opening configured to receive the collar,
the plate provided with serrations disposed to matingly engage the serrations on the collar.

7. The apparatus of claim 1 wherein the collar has an axially inward portion provided with a radially extending flange,
the collar further provided with annular serrations on an exterior surface, and
the retaining means comprise a plate overlying the flange to hold the flange against the housing and having an opening sufficiently large to receive the collar,
the plate provided with annular serrations disposed about the opening configured to matingly engage the serrations on the collar,
the flange having a sufficiently large transverse dimension to prevent receipt of the flange within the housing.

8. The apparatus of claim 1 wherein
the collar has an axial portion terminating inwardly in a radially extending flange,
the axial portion provided with serrations on an exterior lateral surface, and
the retaining means comprise a plate overlying the flange to hold the flange against the housing and having an opening sufficiently large to receive the axial portion of the collar,
the plate provided with serrations disposed to matingly engage the serrations on the collar,
the flange having a sufficiently large transverse dimension to prevent receipt of the flange within the opening.

9. The apparatus of claim 6 wherein
the collar is provided with serrations on an exterior lateral surface.

10. The apparatus of claim 7 wherein
the collar is provided with annular serrations on an exterior lateral surface.

11. The apparatus of claim 5 wherein the collar is provided with serrations on an exterior lateral surface.

12. Adjustable interlock apparatus for a control unit having a shaft rotatably supported in and axially translatable with respect to a housing comprising,
a collar disposed about the shaft and having a notch in an axially outward surface,
engaging means connected to the shaft and having an axially inward surface abutting the axially outward surface of the collar for preventing axial translation of the shaft toward the housing when the shaft is rotated from a selected interlock position,
the engaging means further configured to engage the notch when the shaft is rotated to the selected interlock position thereby permitting axial translation of the shaft toward the housing,
and retaining means connected to the housing and collar for securing the collar in a rotational orientation selected to permit engagement of the notch and engaging means when the shaft is rotated to the interlock position.

13. The apparatus of claim 12 wherein
the retaining means further secures the collar against axial movement.

14. The apparatus of claim 12 wherein
the collar is provided with annular serrations on an exterior lateral surface, and
the retaining means comprise a plate having an opening configured to receive the collar,
the plate provided with annular serrations disposed about the opening configured to matingly engage the serrations on the collar.

15. The apparatus of claim 12 wherein
the collar has an axial portion terminating inwardly in a radially extending flange,
the axial portion provided with annular serrations on an exterior lateral surface, and
the retaining means comprise a plate overlying the flange to hold the flange against the housing and having an opening sufficiently large to receive the axial portion of the collar,
the plate provided with annular serrations disposed about the opening configured to matingly engage the serrations on the collar,
the flange having a sufficiently large transverse dimension to prevent receipt of the flange within the opening.

16. The apparatus of claim 12 wherein
the collar has an axially inward portion provided with a radially extending flange,
the collar further provided with serrations on an exterior surface, and
the retaining means comprise a plate overlying the flange to hold the flange against the housing and having an opening sufficiently large to receive the collar,
the plate provided with serrations disposed to matingly engage the serrations on the collar,
the flange having a sufficiently large transverse dimension to prevent receipt of the flange within the housing.

17. The apparatus of claim 12 wherein
the collar is provided with serrations on an exterior surface, and
the retaining means comprise a plate having an opening configured to receive the collar,
the plate provided with serrations disposed to matingly engage the serrations on the collar.

18. The apparatus of claim 12 wherein
the collar has an axially inward portion provided with a radially extending flange,
the collar further provided with annular serrations on an exterior surface, and
the retaining means comprise a plate overlying the flange to hold the flange against the housing and having an opening sufficiently large to receive the collar, the plate provided with annular serrations disposed about the opening configured to matingly engage the serrations on the collar, the flange having a sufficiently large transverse dimension to prevent receipt of the flange within the housing.

19. The apparatus of claim 12 wherein the collar has an axial portion terminating inwardly in a radially extending flange, the axial portion provided with serrations on an exterior lateral surface, and the retaining means comprise a plate overlying the flange to hold the flange against the housing and having an opening sufficiently large to receive the axial portion of the collar, the plate provided with serrations disposed to matingly engage the serrations on the collar, the flange having a sufficiently large transverse dimension to prevent receipt of the flange within the opening.

20. The apparatus of claim 17 wherein the collar is provided with serrations on an exterior lateral surface.

21. The apparatus of claim 18 wherein the collar is provided with annular serrations on an exterior lateral surface.

22. The apparatus of claim 16 wherein the collar is provided with serrations on an exterior lateral surface.

23. The apparatus of claim 1 further comprising release means connected to the engaging means for disengaging the notch and the engaging means when the shaft is in the interlock position.

24. The apparatus of claim 3 further comprising release means connected to the engaging means for disengaging the notch and the engaging means when the shaft is in the interlock position.

25. The apparatus of claim 4 further comprising release means connected to the engaging means for disengaging the notch and the engaging means when the shaft is in the interlock position.

26. The apparatus of claim 12 further comprising release means connected to the engaging means for disengaging the notch and the engaging means when the shaft is in the interlock position.

27. The apparatus of claim 15 further comprising release means connected to the engaging means for disengaging the notch and the engaging means when the shaft is in the interlock position.

* * * * *